United States Patent [19]

Long et al.

[11] Patent Number: 4,554,210
[45] Date of Patent: Nov. 19, 1985

[54] LAMINATED ANTI-STATIC SKIN-PACKAGING MATERIAL

[75] Inventors: Stuart G. Long, South Laguna; Michael J. Maciocia, Ontario, both of Calif.

[73] Assignee: General Dynamics Pomona Division, Pomona, Calif.

[21] Appl. No.: 597,975

[22] Filed: Apr. 9, 1984

[51] Int. Cl.⁴ .................. B32B 15/08; B32B 27/08
[52] U.S. Cl. .................. 428/349; 428/516; 428/212
[58] Field of Search .................. 428/349, 516, 409

[56] References Cited

U.S. PATENT DOCUMENTS

| | | | |
|---|---|---|---|
| 2,248,579 | 7/1941 | Moore | 229/87.5 |
| 2,274,712 | 3/1942 | Kroner | 206/57 |
| 2,327,713 | 8/1943 | Hunter | 206/62 |
| 2,341,360 | 2/1944 | Bulgin | 154/43 |
| 3,085,025 | 4/1963 | Eaton | 117/9 |
| 3,143,364 | 8/1964 | Klein | 285/55 |
| 3,572,499 | 3/1971 | Mondano | 206/1 |
| 3,839,135 | 10/1974 | Lowry et al. | 161/65 |
| 3,936,565 | 2/1976 | Good | 428/516 X |
| 4,126,262 | 11/1978 | Thompson et al. | 428/516 X |
| 4,147,291 | 4/1979 | Akao et al. | 428/516 X |
| 4,208,696 | 6/1980 | Lindsay et al. | 361/212 |
| 4,258,848 | 3/1981 | Akao et al. | 428/516 X |
| 4,284,672 | 8/1981 | Stillman | 428/35 |
| 4,289,831 | 9/1981 | Last | 428/349 X |
| 4,301,040 | 11/1981 | Berbeco | 252/511 |
| 4,309,466 | 1/1982 | Stillman | 428/35 |
| 4,363,071 | 12/1982 | Rzepecki et al. | 361/220 |
| 4,380,567 | 4/1983 | Shigemoto | 428/349 X |
| 4,407,872 | 10/1983 | Horii | 428/349 X |

Primary Examiner—George F. Lesmes
Assistant Examiner—Nancy A. B. Swisher
Attorney, Agent, or Firm—Neil F. Martin; Terrance A. Meador; Edward B. Johnson

[57] ABSTRACT

A laminated packaging film useful for skin-packaging electrostatic-sensitive items and protecting the items from electrostatic damage during packaging and while the items are vacuumed, contained, and removed from packages. The film includes a pair of sheets of highly resistive, heat-sealable plastic between which is sandwiched a sheet of conductive, heat-sealable plastic. The film resists the buildup of static charges while the item is being packaged and forms a protective Faraday cage while the item is contained in the package.

2 Claims, 2 Drawing Figures

ND ANTI-STATIC SKIN-PACKAGING MATERIAL

The Government has rights in this invention pursuant to Contract No. N00024-81-C-7087, awarded by the U.S. Navy.

BACKGROUND OF THE INVENTION

The field of the invention includes laminated, organic plastic film which is used for packaging. More particularly, the present invention relates to laminated, anti-static film for use in skin-packaging operations in which static-sensitive items are packaged.

The conventional skin-packaging process is widely used in the electronics industry for packaging items such as electronic modules or circuit card assemblies which are to be stored or transported. The skin-packaging procedure consists of heating a plastic film to a semi-molten state, drawing a vacuum between the film, the item to be packaged, and a coated substrate such as fiberboard and then drawing the film over and around the item, forming a heat sealable bond with the coated substrate. As a result, the vacuum between the film, the packaged item and the substrate is thereby maintained.

During the packaging process friction between the film and the packaged item may cause a buildup of static electricity which can discharge and damage static-sensitive components in the item or the item itself. Moreover, it is also possible that, while the item is contained in the package, a static discharge may occur between the packaged item and another object outside of the package. It is therefore necessary to provide protection against static discharge for static-sensitive items which are undergoing a skin-packaging operation.

Anti-static storage packages are known in the art. One example of such a package is found in U.S. Pat. No. 2,327,713 to Hunter, which discloses an anti-static packaging material made up of two outer layers of nonabrasive paper which enclose an opaque high density paper. The material is useful for protecting photographic film from static discharge and exposure to light during storage. Another example of a static-reducing storage material is found in U.S. Pat. No. 3,572,499 to Mondano, in which a laminated packaging material is disclosed which consists of a layer of metal foil which is sandwiched between two sheets of electrically conductive plastic. The material taught in the Mondano patent can be used to form a sealed package by forming a thermal bond between the plastic laminations of two opposing sheets of material. However, because of the presence of the inner layer of metal foil the Mondano material is not useful for skin-packaging operations. Still another laminated plastic structure is taught in U.S. Pat. No. 3,143,364 to Klein, wherein an aluminized polyethylene sheet is bonded to a non-porous substrate. The Klein patent process is intended primarily to bond a film of polyethylene to another material having a nonporous surface such as nonmetallized polyethylene, and is intended primarily for sealing together plastic pipe parts; the process is inappropriate for use in skin-packaging operations.

Other laminated plastic materials utilized to form food containers are disclosed in U.S. Pat. Nos. 4,309,466 and 4,284,672 both to Stillman. In the Stillman patents, the disclosed packaging materials are both composed of layers of plastic which are selected for their properties of strength and durability, and not for electrical characteristics. Hence, they provide no protection for static-sensitive items.

In U.S. Pat. No. 4,363,071 to Rzepecki et al., a multilayer static-dissipative mat is disclosed in which a layer of conductive material is enclosed between two layers of resistant material so that static charges can be collected by the conductive material and conducted to ground through one of the resistive layers. However, the materials used to construct the layers of the mat are selected for strength and durability and are unsuitable for use in skin-packaging operation. Other U.S. Patents which provide examples of packaging materials with electrically conductive or resistive characteristics are: U.S. Pat. Nos. 2,341,360; 3,839,135; 4,208,696; and 4,301,040. However, none of the examples pertain to skin-packaging operations and they are therefore inappropriate for use in such operations.

Other references containing information which is germane to the packaging or plastic material arts are: U.S. Pat. Nos. 3,085,025; 2,248,579; and 2,274,712.

Therefore, there exists a need for a film material useful in skin-packaging operations which possesses the ability to prevent the buildup of an electrostatic potential between itself and a static-sensitive item during packaging operations and while the item is contained in the package.

It is therefore the principle object of the present invention to provide a material useful in skin-packaging operations which prevents the buildup of electrostatic potential between itself and a static-sensitive item which is to be packaged.

It is a further object to provide such a material which also reduces the likelihood of an electrical discharge occurring between the packaged item and another object while the item is contained in the package.

These and other objects of the invention will become more apparent from the ensuing description when taken together with the drawing.

SUMMARY OF THE INVENTION

The material according to the invention achieves the foregoing objects by employing a pair of thin flexible plastic sheets having high electrical resistivity and sandwiching therebetween and securing thereto a third thin, electrically conductive plastic sheet.

Each of the plastic sheets which make up the film is composed of an organic plastic material which is selected to be heat-sealable so that the resulting film can be used in a skin-packaging apparatus. The use of high-resistivity outer sheets in the film permits the film to be used in either orientation and dispenses with the need for registering one face of the film to maintain a single anti-static surface in contact with an item to be packaged. Further, the conductive layer which is held between the two outer layers provides a Faraday shield which surrounds the packaged item and protects it from static discharge originating from another object outside of the package. This shielding is particularly effective when the skin packaging operation is performed in conjunction with an antistatic coated conductive fiberboard substrate such as is described in our accompanying patent application entitled "Packaging Material with Anti-Static Coating and Method of Making Same, Ser. No. 597,974, filed Apr. 9, 1984".

DETAILED DESCRIPTION OF THE PREFERRED EMBODIMENT

Figure 1:
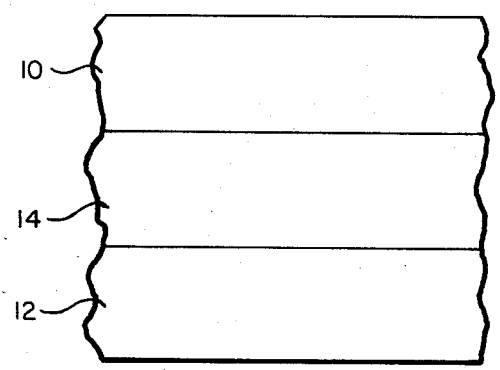
FIG. 1 is an enlarged partial sectional view illustrating the construction of the anti-static film of the invention.
Figure 2:
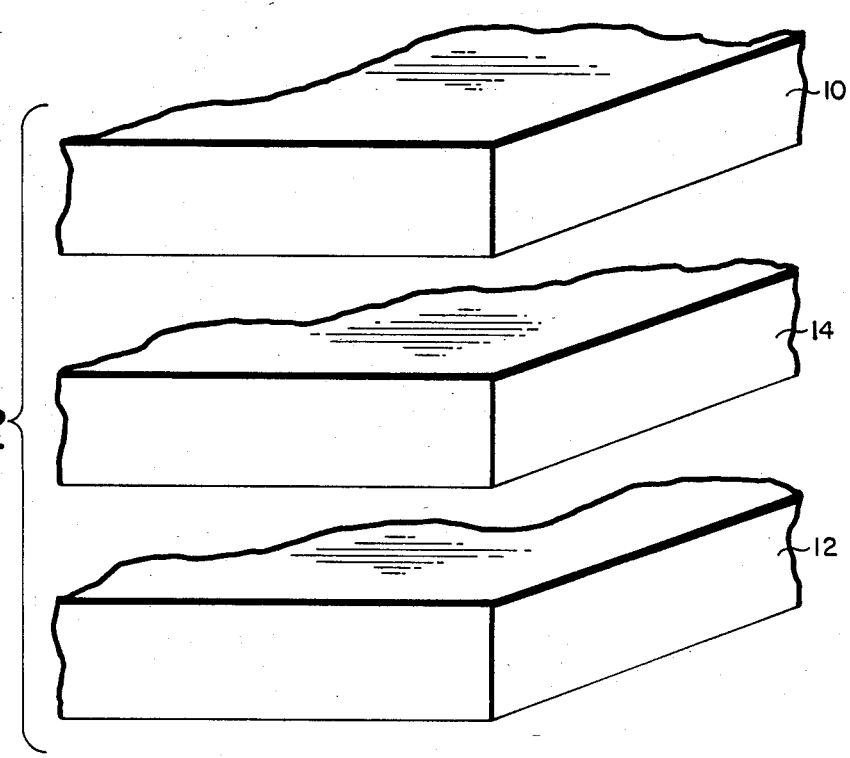
FIG. 2 is an exploded perspective view of the film of the invention showing coextension and alignment of the layers of the film of the invention.

In FIGS. 1 and 2, the film of the invention is shown in the form of a sheet of material which includes three separate lamina 10, 12 and 14. The layers 10 and 12 can comprise, for example, this coextensive sheets of heat sealable anti-static semi-conductive polyethylene which is characterized in having a high surface resistivity, for example, $1 \times 10^{16}$ OHMS per square. Such material is commercially available in sheets from, for example, Richmond Corporation, Redlands, Calif.

The middle layer 14 can comprise a continuous sheet of heat sealable conductive polyethylene which is coextensive with the two resistive sheets 10 and 12. The layer 14 is characterized in having a volume resistivity of no more than $1 \times 10^3$ ohms per centimeter. A heat-sealable conductive polyethylene material is available from the 3M Corporation, Minneapolis, Minn.

The layers 10, 12 and 14 can be bonded in the order illustrated by commercially available bonding agents such as adhesives and then subjected to a curing process which can include the application of pressure to the sheets in an environment including an elevated ambient temperature. Alternatively, the sheets can be laminated by any conventional continuous process which combines both production of the sheets and their lamination. For example, the sheets may be drawn from a tri-slot excrusion die through a bath of adhesive material and then nipped between a pair of pressure rollers while exposed to an elevated ambient temperature which accelerates the curing of the adhesive.

It should be evident that the material of the invention can be formed into extensive elongated sheets and gathered in rolls for use in automated skin-packaging operations. An exemplary skin-packaging apparatus comprises the Poly-Tite Port-A-Vac 300 Serial manufactured by Ampack Packaging Machinery, Anderson, S.C.

When the film illustrated in FIGS. 1 and 2 is employed in a skin-packaging operation, it may be oriented so that either layer 10 or layer 12 contacts the item to be packaged. Either layer will prevent damage due to triboelectric charges which may be generated in the skin-packaging and handling operation by mechanical friction between the film and the item. Either of the anti-static layers 10 or 12 resists the accumulation of static by virtue of its high surface resistivity. In addition, the layers 10 and 12 act as barriers which prevent direct contamination of the packaged item by the conductive layer 14. Typically, the material with which a polyethylene layer may be impregnated to provide the desired conductive characteristics can be sloughed from the film and contaminate the packaged item. However, when the film is applied to the item during the skin-packaging operation, the anti-static layer which contacts the item will prevent its direct contamination by material sloughed from conductive layer 14.

It should be evident that the provision of the heat sealable conductive layer 14 provides an elctrostatic shielding barrier which electrically protects the packaged item while it is contained in the skin package formed by the film of the invention. The film envelopes the item to create a Faraday cage which protects the item from an electrostatic discharge originating at an object outside of the package.

The foregoing description taken together with the appended claims constitutes a disclosure which is sufficient to enable a person skilled in the packaging art and having the benefit of the teachings contained herein to make and use the invention. Further, the film described hereinabove meets the aforementioned stated objects of the invention by providing resistance to the creation of the static-electric potential between the film and an item which it packages by the provision of two anti-static layers, and further affords an electrostatic shield which surrounds the item when it is packaged and protects it from electrostatic discharge from a source outside the package.

Obviously, many modifications and variations are possible in the light of the above teachings, and it is therefore understood that the invention may be practiced otherwise than as specifically described.

What is claimed is:

1. A laminated, anti-static, heat sealable packaging material for packaging and preventing contamination of an electrostatically sensitive item packed in said packaging material, comprising:
    a first outer layer of heat-sealable, semi-conductive polyethylene having a surface resistivity at least $1 \times 10^{16}$ ohms per square;
    a second outer layer of heat-sealable, semi-conductive polyethylene having a surface resistivity at least $1 \times 10^{16}$ ohms per square; and
    a middle layer of heat-sealable polyethylene impregnated with a sloughable, electrically-conductive material providing said middle layer with a volume resistivity no more than $1 \times 10^3$ ohms per centimeter, said middle layer bondedly sandwiched between said first and second layers to prevent said electrically-conductive material sloughing from said middle layer to contaminate an electrostatically sensitive item when said item is heat-sealably packaged in said packaging material.

2. A laminated flexible, skin-packaging material for heat sealably skin-packaging a static-sensitive item, comprising:
    a first outer layer of heat sealable electrically semi-conductive polyethylene having a surface resistivity exceeding $1 \times 10^{16}$ ohms per square;
    a second outer layer of heat-sealable electrically semi-conductive polyethylene having a surface resistivity exceeding $1 \times 10^{16}$ ohms per square; and
    a middle layer of heat-sealable polyethylene sandwiched between and bonded to said first and second outer layers and having a volume resistivity of less than $1 \times 10^3$ ohms per centimeter.

* * * * *